(12) United States Patent
Schulz et al.

(10) Patent No.: US 11,396,149 B2
(45) Date of Patent: Jul. 26, 2022

(54) METHOD FOR PRODUCING AND/OR RECYCLING A CONVEYOR BELT, AND CONVEYOR BELT

(71) Applicant: FORBO SIEGLING GMBH, Hannover (DE)

(72) Inventors: Lennart Schulz, Hannover (DE); Torsten Buch, Wedemark (DE)

(73) Assignee: FORBO SIEGLING GMBH, Hannover (DE)

( * ) Notice: Subject to any disclaimer, the term of this patent is extended or adjusted under 35 U.S.C. 154(b) by 405 days.

(21) Appl. No.: 16/479,604

(22) PCT Filed: Jan. 26, 2018

(86) PCT No.: PCT/EP2018/051960
§ 371 (c)(1),
(2) Date: Jul. 22, 2019

(87) PCT Pub. No.: WO2018/138262
PCT Pub. Date: Aug. 2, 2018

(65) Prior Publication Data
US 2021/0362448 A1 Nov. 25, 2021

(30) Foreign Application Priority Data
Jan. 26, 2017 (DE) ...................... 10 2017 101 562.0

(51) Int. Cl.
*B65G 15/34* (2006.01)
*B65G 15/30* (2006.01)
(Continued)

(52) U.S. Cl.
CPC ............. *B29D 29/06* (2013.01); *B65G 15/34* (2013.01); *B29K 2105/26* (2013.01)

(58) Field of Classification Search
None
See application file for complete search history.

(56) References Cited

U.S. PATENT DOCUMENTS 3,981,206 A 9/1976 Miranti, Jr. et al.
4,708,610 A 11/1987 Standley
(Continued)

FOREIGN PATENT DOCUMENTS

CN 101161710 A 4/2008
DE 1055898 B 4/1959
(Continued)

OTHER PUBLICATIONS

Chunhua, "Introduction to Polymer Science," p. 97, Dec. 2013, Harbin Institute of Technology, Heilongjiang, China.

*Primary Examiner* — Kavel Singh
(74) *Attorney, Agent, or Firm* — Leydig, Voit & Mayer, Ltd.

(57) ABSTRACT

A method for producing and/or recycling a conveyor belt, the conveyor belt having at least one belt layer, the at least one belt layer or one of the belt layers including a tension member, the tension member including a matrix material and filaments embedded in the matrix material, includes: providing a tension member starting material by: providing a recyclate, which already contains filaments or filament groups, or combining a recyclate, which already contains filaments or filament groups, with the matrix material and/or filaments, or combining the matrix material with filaments; producing an extrudable state of the tension member starting material by mixing the provided tension member starting material in a mechanically-aided manner and influencing a temperature on the provided tension member starting material; and extruding the tension member, forming the at least one belt layer of the conveyor belt, from the tension member starting material.

17 Claims, 1 Drawing Sheet

(51) Int. Cl.
*B65G 15/32* (2006.01)
*B29D 29/06* (2006.01)
*B29K 105/26* (2006.01)

(56) References Cited

U.S. PATENT DOCUMENTS

| | | | |
|---|---|---|---|
| 5,925,581 A | 7/1999 | Tolbert | |
| 7,267,219 B2 * | 9/2007 | Vogt | B65G 15/34 |
| | | | 198/846 |
| 9,334,122 B2 * | 5/2016 | Shoji | B65G 15/30 |
| 9,579,839 B2 * | 2/2017 | Kenny | B29C 48/914 |
| 2008/0289745 A1 | 11/2008 | Van Duyn | |

FOREIGN PATENT DOCUMENTS

| | | |
|---|---|---|
| DE | 8816293 U1 | 7/1989 |
| DE | 102006023231 A1 | 11/2007 |
| DE | 102006028563 A1 | 12/2007 |
| DE | 102007008813 A1 | 8/2008 |
| DE | 102010017479 A1 | 12/2011 |
| DE | 102011053143 A1 | 2/2013 |
| GB | 2082116 A | 3/1982 |
| JP | S4638324 B | 11/1971 |
| JP | S486448 U | 1/1973 |
| JP | S5535280 A | 9/1980 |
| JP | S57154545 A | 9/1982 |
| JP | S597058 A | 2/1984 |
| JP | H 10338377 A | 12/1998 |
| JP | 3174716 B2 | 6/2001 |
| JP | 2009242007 A | 10/2009 |
| JP | 4470057 B2 | 6/2010 |
| WO | 9718148 A1 | 5/1997 |

* cited by examiner

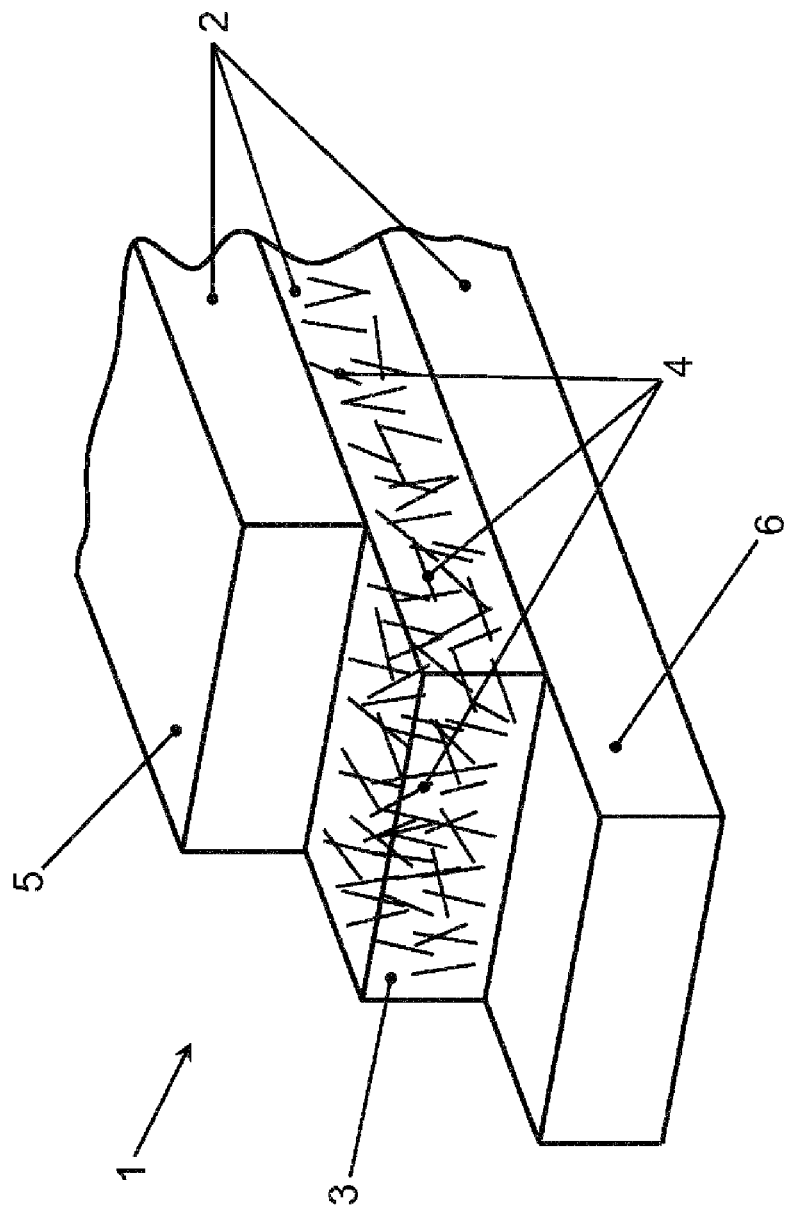

METHOD FOR PRODUCING AND/OR RECYCLING A CONVEYOR BELT, AND CONVEYOR BELT

CROSS-REFERENCE TO PRIOR APPLICATIONS

This application is a U.S. National Phase application under 35 U.S.C. § 371 of International Application No. PCT/EP2018/051960, filed on Jan. 26, 2018, and claims benefit to German Patent Application No. DE 10 2017 101 562.0 filed on Jan. 26, 2017. The International Application was published in German on Aug. 2, 2018 as WO 2018/138262 under PCT Article 21(2).

FIELD

The invention relates to a method for producing and/or recycling a conveyor belt, and to a conveyor belt provided for this purpose.

BACKGROUND

In order to transport goods of the most different types, such as bulk goods, luggage, foodstuffs, or wastes, conveyor belts are often used in said different areas, as a result of which the most varied demands, depending upon the application, are placed on such a conveyor belt.

In general, however, it can be assumed that the conveyor belt must be given low extensibility along with low bending stiffness, especially in the longitudinal direction, due to the usually relatively long conveying paths, in order to minimize elongation of the conveyor belt during operation and to simultaneously allow the conveyor belt to be deflected around guiding and/or driving drums, for example.

In order to meet these requirements, textile woven fabrics, steel cables, or both are generally introduced into or as at least one layer of a conveyor belt in order to achieve the desired mechanical properties—for example, with regard to tensile strength, extensibility, and transverse stiffness. This layer is usually called a tension member and is generally located between two further layers—the carrying side and the running side. These conveyor belts can thus be differentiated into steel cable conveyor belts and fabric conveyor belts on the basis of the introduced tension member.

Disadvantageous in the incorporation of woven fabrics or steel cables into a conveyor belt formed in this way is the lack of recyclability, or recyclability that can only be realized very expensively. Furthermore, following their manufacture, the conveyor belts are packaged in webs and connected at the web ends to form an endless belt. In this connection region, these conveyor belts generally have reduced mechanical properties in comparison to the remaining belt.

The steel cable and fabric conveyor belts described are the most widely used conveyor belt variants. In addition, different embodiments of conveyor belts have been developed.

DE 1 055 898 B, for example, describes a conveyor belt which has at least one layer with fibers—in particular, textile fibers which do not form woven fabric—introduced in an unordered layer. The admixture in this case takes place in order to make the layer hard and tough, i.e., with an increased Shore hardness. This layer, which is designed to not necessarily, but preferably, be hard and tough as a result of the admixture of the fibers, serves to minimize or distribute the pressure peaks occurring in the region of the pulling cables of the actual tension member—here, preferably steel cables—during the deflection of the belt around a drum.

Such admixture of loose fibers is also known from another field. In this respect, U.S. Pat. No. 3,981,206 A describes a toothed belt which has such a layer enriched with individual fibers. This layer does not, however, serve as a tension member per se, but as a base layer. The fibers introduced into this base layer are preferably aligned transversely to the direction of movement of the belt in order to thereby achieve an increase in transverse stability.

DE 10 2006 023 231 A1 furthermore shows fibers for an elastomer product, wherein further short threads are embedded in the fiber matrix in a directed manner, and several of the fibers are twisted separately or twisted together and form a reinforcing support of the elastomer product, e.g., the carcass of a tire. In a preferred embodiment, the orientation of the short threads is formed in the longitudinal direction of the fiber.

In the context of increasingly demanded ecological effectiveness with increased sustainability of production processes, it is increasingly necessary to also pay attention to the recycling of the raw materials used for the production of conveyor belts.

In this respect, DE 10 2006 028 563 A1, inter alia, describes a method for recycling rubber conveyor belts reinforced with steel cables, wherein such a conveyor belt passes through a cold chamber at temperatures of down to −120° C.

In the process, the rubber of the conveyor belt becomes brittle and can be separated from the steel cables by means of a subsequent mechanical load when passing through two deflection rollers and an additional ultrasonic treatment.

DE 10 2011 053 143 A1, on the other hand, describes a method for comminuting such conveyor belts reinforced with steel cables, wherein the initially wound conveyor belt is pre-comminuted by means of plate shears, and the thus produced sections of the conveyor belt are subsequently comminuted further to a final piece size by means of two shredders passed through one after the other.

A similarly designed procedure in the context of the recycling of old steel cable conveyor belts is disclosed in DE 10 2010 017 479 A1, wherein the conveyor belt is likewise first comminuted by means of a shredder, but subsequently supplied to a milling scraper which separates the rubber of the conveyor belt from the steel cables. Large steel cable remains are then separated from small steel cable remains and the rubber by means of a sifting process. Subsequently, the small remains pass through a magnetic separator, whereby steel cable remains are separated from the rubber. The rubber remains thus largely free of steel are finally further processed to form a granulate.

In addition to the methods illustrated, there is also the possibility of separating steel-reinforced rubber conveyor belts from one another by means of a pyrolysis method. In this case, the conveyor belt is subjected to high temperatures of 200° C. to 900° C. over several hours in the absence of oxygen. During this time, rubber decomposes into soots, oils, as well as other components, and more or less forms a powder. The steel reinforcements of a rubber conveyor belt thus recovered can simply be removed from the powder after completion of the process. However, such a method requires a very high technical outlay and can only be used for rubber conveyor belts which have a steel reinforcement; conveyor belts made of plastics with, for example, a textile reinforcement cannot be recycled in this way.

DE 10 2007 008 813 A1 also discloses a conveyor belt for paper or cardboard machines, for example, which has a load-bearing structure which consists of one or more polymer layers. Fibers and/or fillers, which can have different lengths, are embedded in one or more of the polymer layers. The fibers in this case consist, in particular, of aramid, glass, or carbon, whereas the polymer layers consist of polyurethane, polyamide, or HDPE.

U.S. Pat. No. 4,708,610 A shows, inter alia, V-belts which can be differentiated into at least one section, wherein fibers having the same or a different orientation are introduced into the one section or several sections. In this case, the V-belt is produced in a cylindrical casting mold, wherein a cylindrical magnet device, the pole orientation of which is oriented to be parallel to the longitudinal axis, on the one hand, and perpendicular to the longitudinal axis, on the other, is arranged coaxially to and encloses the casting mold in order to orient the fibers introduced into the basic material of the V-belt, and an alignment of the fibers along the field lines of the magnet device is to be achieved as a result of the magnetic fields generated in this way. Similarly, the orientation of the fibers is also described by an electric field.

SUMMARY

In an embodiment, the present invention provides a method for producing and/or recycling a conveyor belt, the conveyor belt having at least one belt layer, the at least one belt layer or one of the belt layers comprising a tension member, the tension member comprising a matrix material and filaments embedded in the matrix material, the method comprising: providing a tension member starting material by: providing a recyclate, which already contains filaments or filament groups, or combining a recyclate, which already contains filaments or filament groups, with the matrix material and/or filaments, or combining the matrix material with filaments; producing an extrudable state of the tension member starting material by mixing the provided tension member starting material in a mechanically-aided manner and influencing a temperature on the provided tension member starting material; and extruding the tension member, forming the at least one belt layer of the conveyor belt, from the tension member starting material; or extruding the tension member, forming a belt layer of the conveyor belt, from the tension member starting material, and connecting the tension member to at least one further belt layer in order to form the conveyor belt.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a development of a recyclable conveyor belt.

DETAILED DESCRIPTION

In an embodiment, the present invention provides a possibility of designing a method of the type mentioned at the outset in such a way that the production and/or recycling of a conveyor belt can be carried out with a lower outlay in comparison to the prior art.

Furthermore, the aim of the invention is to provide a conveyor belt intended for carrying out the method.

According to the invention, a method for producing and/or recycling a conveyor belt is therefore provided, wherein this conveyor belt has at least one belt layer, and this belt layer or one of the belt layers is formed as a tension member. The tension member in this case consists at least of a matrix material and filaments embedded in this matrix material. The method comprises providing a tension member starting material by providing a recyclate, which already contains filaments or filament groups, or by combining a recyclate, which already contains filaments or filament groups, with a matrix material and/or filaments or by combining the matrix material with filaments, producing an extrudable state of the tension member starting material by mixing the provided tension member starting material in a mechanically-aided manner and influencing the temperature on the provided tension member starting material, and extruding the tension member, forming the at least one belt layer of the conveyor belt, from the tension member starting material or extruding the tension member, forming a belt layer of the conveyor belt, from the tension member starting material, and connecting the tension member to at least one further belt layer in order to form the conveyor belt. According to the invention, the conveyor belt can thus consist of one belt layer, wherein the tension member formed in this respect by this belt layer is not made of a belt layer reinforced with steel cables or textile woven fabrics, but of a belt layer reinforced with filaments.

The production or recycling of the conveyor belt or of the tension member of the conveyor belt can in principle be carried out in several ways by a different provision of the tension member starting material. On the one hand, it is conceivable that only a provided recyclate which already contains the correspondingly desired proportions of filaments and/or matrix material as initial proportions be used. In addition, the admixture of matrix material and/or filaments to the recyclate offers a further possibility, as a result of which adaptation to desired proportions in the tension member or conveyor belt to be produced can be made possible. In particular, with regard to a first-time—so to speak—production of a conveyor belt designed per se for recycling, this can be carried out by adding filaments to the matrix material. Complex separation of the filaments from the respective conveyor belt to be recycled is, in this connection, not necessary in any case.

Regardless of the unnecessary separation, it is nevertheless conceivable for the matrix material to also consist of a recyclate without filaments and/or for the filaments separated from the tension member of the conveyor belt to be introduced again into the tension member starting material.

The mechanically-aided mixing of the tension member starting material and the influence of temperature on this tension member starting material, provided following the provision of the tension member starting material, could take place via a compounder, or compounding machine, i.e., a mixing device which is simultaneously in the form of an extruder and into which the tension member starting material consisting of matrix material and filaments can be introduced separately or in an already-mixed form. By means of mixers, such as screw conveyors, arranged in the compounder, a first-time mixing of the tension member starting material, in the case of separate introduction of the matrix material, and the filaments or a further mixing of the tension member starting material, in the case of an already-combined introduction, can take place. The temperature influence on the tension member starting material can be in the form of heating the tension member starting material, wherein the matrix material is heated above its glass transition temperature or its melting temperature, so that the matrix material, and thus also the tension member starting material, is, so to speak, present in liquid—in particular, viscous—form with the filaments which continue to be in solid state.

In addition to an embodiment consisting of one belt layer, two belt layers or even three belt layers could, in particular, also be provided, wherein, in the case of three belt layers, one belt layer can be formed as a tension member, one belt layer as a carrying side, and one belt layer as a running side.

In such an embodiment of the conveyor belt with more than one belt layer, the tension member could be cut to a variable length before being connected to the at least one further belt layer and could subsequently be connected to the correspondingly cut at least one belt layer, or the tension member and the at least one further belt layer could be connected to one another and subsequently cut to a variable length. An endless conveyor belt can thereby be produced by connecting the web ends of the cut conveyor belt.

In the case of the matrix material, it is also possible for it to be an elastomer—in particular, a thermoplastic elastomer. Specifically, the matrix material could be in the form of a plastic or a rubber.

It is also conceivable that the quantity, i.e., the mass or the volume, of supplied matrix material be only high enough that a filament structure can still be recognized in the extruded tension member—in particular, by the human eye—which means that the ratio of the volumes of matrix material to filaments can be less than two to one, even one to one or one to two, for example. The matrix material would thus only thinly surround the filaments in the form of a shell.

The recyclate itself can, in principle, be regarded as any thermoplastically-moldable, filament-containing material to be recycled. This material is preferably formed from worn conveyor belts to be recycled.

The filaments introduced into the tension member of the conveyor belt could also differ in their length, diameter, and/or material properties, depending upon the requirements for the mechanical properties of the tension member or of the conveyor belt. It is conceivable in this respect that, in addition to the use of a single type of filaments, several—at least two—differing filament types be admixed into the tension member starting material.

Filaments introduced into the tension member of the conveyor belt could, for example, be metal, glass, or even polymer fibers of polypropylene, polyurethane, polyethylene, or other plastics, as well as textile, aramid, ceramic, or natural fibers of, for example, wood or cotton, as well as fibers of plastics reinforced with glass fibers and/or carbon fibers.

The length of the filaments could be in a range of 0.1 millimeters to 50 millimeters, and the diameter in a range of 0.1 millimeters to 3 millimeters.

In a particularly advantageous development of the method, filaments and/or matrix material are supplied to the tension member starting material, depending upon an initial proportion of filaments in the recyclate, until a desired proportion of filaments and/or a desired proportion of matrix material is reached. This procedure easily ensures that the tension member to be produced of the conveyor belt has the desired properties, which are provided for the conveyor belt and are dependent upon the initial proportions of filaments in the recyclate, independently of the recyclate used.

The initial proportions and the desired proportions can be determined in this case as percentage by weight, by volume, or by mass.

It proves to be particularly promising if the recyclate is produced by comminution of the conveyor belt. By comminution of the conveyor belt and the therewith associated production of the recyclate from the conveyor belt, it is in the realm of possibility for the recycling of the conveyor belt to be facilitated by the uncomplicated handling and processing of the comminuted conveyor belt pieces. The conveyor belt, therefore, does not have to be processed as a whole.

Comminution of the conveyor belt could be carried out, for example, using cutting tools and/or at least one shredder.

In an also advantageous embodiment, the recyclate is produced by comminuting a conveyor belt containing an insert in the form of a woven, interlaced, and/or knitted fabric. Due to the comminution of the conveyor belt, the insert would be divided into filament groups, wherein these filament groups could optionally be further disentangled into filaments by the mechanically-aided mixing as well as the influence of temperature on the tension member starting material.

In an also practical embodiment of the method, the initial proportion of filaments in the recyclate is higher than the desired proportion of filaments in the tension member of the conveyor belt. Thus, only matrix material would, advantageously, have to be supplied to the recyclate, as a result of which conveyor belts which are not intended for recycling from the outset could also be supplied to recycling.

If the filaments in the tension member of the conveyor belt are present in an undirected state within the original material, it could, inter alia, be achieved that connecting the conveyor belt to an endless conveyor belt would not bring about a change in the conveyor belt properties in the region of the joint, which properties would be, so to speak, isotropic over the entire conveyor belt. The mechanical properties of the conveyor belt in the joint would thus correspond completely or almost to the mechanical properties in uninterrupted regions of the conveyor belt. An interruption of the tension member, as in the case of a conveyor belt reinforced with textile woven fabrics or steel cables, and the associated reduction in the tensile strength, for example, are not present or only present to a very minor extent.

Connecting the web ends to form an endless conveyor belt could take place in this case by designing the respective web ends with a triangular profile, tooth profile, or even sawtooth profile in the longitudinal direction, with the result that a higher connection length than in the case of mere butt joints can be achieved. Such butt joints are, moreover, also possible.

On the other hand, if the filaments in the tension member of the conveyor belt are in a directed state within the matrix material, further mechanical properties of the conveyor belt, such as the tensile strength or bending stiffness of the conveyor belt, in addition to the change in the hardness of the tension member, could then also be specifically controlled, e.g., via the length, diameter, cross-section, longitudinal profile, and mechanical properties, such as the bending stiffness, of the filaments.

A further advantageous embodiment of the method according to the invention is based upon the fact that the directed state of the filaments in the tension member of the conveyor belt is generated by aligning the filaments, during the extrusion of the tension member, by means of at least one mechanical aligning tool. Such a procedure for aligning the filaments within the tension member could be implemented as a simple and cost-effective solution, with little constructive outlay.

A mechanical aligning tool for alignment in a first spatial direction, e.g., the longitudinal direction of the tension member or conveyor belt, could feature straightening rods arranged at a defined distance from one another which engage in the tension member orthogonally to the direction of movement of the tension member during the extrusion process and cause a movement of the filaments in a defined direction due to mechanical action of the straightening rods on the filaments present in the tension member. In this context, it is conceivable, for example, that the filaments be aligned with their longitudinal direction in the direction of movement of the conveyor belt.

Such a mechanical aligning tool in the longitudinal direction of the tension member or of the conveyor belt can, for example, be embodied as a comb, a brush, or perhaps in the style of a fakir board.

A differently designed alignment possibility by means of a mechanical aligning tool in a second spatial direction, e.g., the transverse direction of the tension member or of the conveyor belt, can take place in the design of a slot die with a flexlip. This flexlip would be designed and/or positioned in such a way that it makes possible an alignment of the filaments. The slot die, however, should be at the exit point of the tension member starting material from, for example, a compounder or extruder.

In the possible shaping of the tension member starting material into the tension member by means of a calender—a roller arrangement—it is conceivable to carry out the alignment of the filaments by a specific adjustment of the roller gap and by utilizing shear forces resulting from different rotational speeds of the rollers.

Another advantageous possibility for aligning the filaments consists in the directed state of the filaments in the tension member of the conveyor belt being produced by aligning the filaments, during the extrusion of the tension member, by applying an external electric field and/or an external magnetic field and/or an external electromagnetic field. It would thus be possible to realize the filaments within the tension member of the conveyor belt without any mechanical influence on the tension member during its extrusion. A direct mechanical intervention, such as dipping into the tension member starting material, would not be necessary.

By applying an external magnetic field, metallic filaments of a ferromagnetic material introduced into, for example, the tension member could be aligned. By means of an applied electric field, it could be made possible to align, within the tension member, non-magnetic filaments, such as filaments of plastics or textile fibers, which, in advance of the processing, were provided with an electric charge, already carry a charge inertly, or are polar.

If the directed state of the filaments in the tension member of the conveyor belt is generated by aligning the filaments by means of a stretching and/or rolling process of the extruded tension member and/or of the conveyor belt, this is to be regarded as a promising variant of the alignment of the filaments in the tension member. In this case, the tension member containing the filaments would have to be produced with a thickness above a desired thickness, wherein the tension member is subsequently reduced to the desired thickness by means of the stretching or rolling process. Due to the stretching or rolling process, the filaments could be aligned substantially in the direction of movement simultaneously to the reduction in thickness.

In a further particularly advantageous embodiment of the method, the mechanical properties of the conveyor belt are specifically influenced by a definable alignment and/or the length and/or the diameter and/or the material and/or the initial proportion of the filaments in the tension member of the conveyor belt.

The initial proportion of the filaments in the tension member can have an influence on the hardness, the flexing resistance and the resistance to rolling, the wear resistance, the tensile strength, and the bending stiffness of the conveyor belt.

Depending upon the initial proportion of the filaments in the tension member, the diameter and the length of these filaments can affect, in particular, the hardness, the tensile strength, and the bending stiffness of the tension member. In addition to these filament properties, there may also be an effect of filament size distribution, i.e., a respective proportion of filaments differing in length and/or diameter and/or cross-sectional shape of the initial proportion of filaments in the tension member, on the mechanical properties, such as hardness, tensile strength, and/or bending stiffness, of the tension member. Furthermore conceivable are filaments which have a shaft or screw shape in their longitudinal direction. In addition, the mechanical properties, such as the bending stiffness, of the filaments themselves can also have effects upon the mechanical properties of the tension member.

With respect to the alignment of the filaments, it is possible that an alignment in the direction of movement of the conveyor belt increases the tensile strength of the conveyor belt, an alignment orthogonal to the direction of movement increases the transverse stiffness of the conveyor belt, or a random alignment increases the hardness of the conveyor belt. By means of an alignment of the filaments at a certain angle within the tension member of the conveyor belt, a migration movement to one side, or even a self-centering, transverse to the direction of movement, of the conveyor belt during its operation could also be achieved.

An extremely expedient development of the method further results from the fact that the filaments are separated from the conveyor belt by melting the conveyor belt and separating the filaments not melted in the process from the melt. On the basis of this procedure, conveyor belt material and filaments would be present separately from one another, as a result of which the resulting conveyor belt material could, for example, be advantageously supplied again as matrix material and filaments to the production process of the conveyor belt. In this case, the conveyor belt material could be the same as the original matrix material, but could also differ therefrom due to use of a different material for further belt layers.

If the unmelted filaments are separated from the melt of the conveyor belt by the intrinsic weight of the filaments and/or by applying an external magnetic field or an electric field or an electromagnetic field and/or a sifting process, this can be regarded as being greatly beneficial. Accordingly, it can consequently be made possible to separate the filaments from the melt according to the type of filaments present in the melt, e.g., characterized by their material, with a method adapted to the type of filaments.

A development of the method according to the invention is also extremely beneficial when the recyclable conveyor belt is cut into sections with a limited number of differing section lengths, on the basis of which an endless conveyor belt of variable length is produced by juxtaposing and connecting several selected sections having identical and/or differing section lengths. As a result, the recyclable conveyor belt can, so to speak, be produced in modular design. By producing sections which have essentially standardized section lengths, conveyor belts with a flexible conveyor belt length could be produced easily from these sections. The sections of the conveyor belt to be produced could be juxtaposed and connected to one another under pressure and temperature to form an endless conveyor belt. Due to the essentially constant mechanical properties in the connection region of the sections, this endless conveyor belt thus produced would be comparable to an endless conveyor belt produced in one piece.

Thus, according to the invention, a conveyor belt for carrying out the method according to the invention is provided, in which conveyor the matrix material of the tension member and/or the belt layer materials of the conveyor belt have a lower melting point than the filaments introduced into the tension member.

Such a conveyor belt according to the invention could consist, for example, of a polymer with polymer filaments introduced into the tension member. The polymer could, inter alia, be formed as a polyurethane, wherein the polymer forming the filaments has a higher melting point than the polymer forming the matrix material or conveyor belt material. In the case of the polyurethane, the filaments would, furthermore, have a higher hardness than, for example, the matrix material. As a result, when the matrix material melts, the filaments could be separated therefrom.

In the case of metal filaments introduced into the tension member of the conveyor belt, the metal filaments could undergo, in addition to the melting of the conveyor belt, an over-temperature by means of induction heating, as a result of which they could be more easily separated from the melt.

FIG. 1 shows a schematic representation of a development of a recyclable conveyor belt 1, wherein this conveyor belt 1 has three belt layers 2 which are firmly bonded to each other, of which a belt layer 2 is formed as a tension member 3. The belt layers 2 forming the conveyor belt 1 are made of the same material—in this case, the matrix material—and the tension member 3 has filaments 4 which are embedded in the matrix material and which are present in an undirected state within the matrix material. The further belt layers 2 are also formed as a carrying side 5 or running side 6 not provided with filaments 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Conveyor belt
2 Belt layer
3 Tension member
4 Filament
5 Carrying side
6 Running side

The invention claimed is:

1. A method for producing a conveyor belt using a recyclate, wherein the recyclate is produced by comminution of another conveyor belt, the conveyor belt having at least one belt layer, the at least one belt layer or one of the belt layers comprising a tension member, the tension member comprising a matrix material and filaments embedded in the matrix material, the method comprising:
providing a tension member starting material by:
providing the recyclate, which already contains filaments or filament groups, or
combining the recyclate, which already contains filaments or filament groups, with the matrix material and/or filaments,
wherein a desired mechanical property of the conveyor belt is configured based on at least one of a definable alignment, a length, a diameter, a material, and an initial proportion of the filaments in the tension member of the conveyor belt;
producing an extrudable state of the tension member starting material by mixing the provided tension member starting material in a mechanically-aided manner and influencing a temperature on the provided tension member starting material; and
extruding the tension member, forming the at least one belt layer of the conveyor belt, from the tension member starting material; or
extruding the tension member, forming a belt layer of the conveyor belt, from the tension member starting material, and connecting the tension member to at least one further belt layer in order to form the conveyor belt.

2. The method according to claim 1, wherein filaments and/or matrix material are supplied to the tension member starting material, depending upon an initial proportion of filaments in the recyclate, until a desired proportion of filaments and/or a desired proportion of matrix material is reached.

3. The method according to claim 1, wherein the recyclate is produced by comminuting another conveyor belt containing an insert in the form of a woven, interlaced, and/or knitted fabric.

4. The method according to claim 2, wherein the initial proportion of filaments in the recyclate is higher than the desired proportion of filaments in the tension member of the conveyor belt.

5. The method according to claim 1, wherein the filaments in the tension member of the conveyor belt are in an undirected state within the matrix material.

6. The method according to claim 1, wherein the filaments in the tension member of the conveyor belt are in a directed state within the matrix material.

7. The method according to claim 6, wherein the directed state of the filaments in the tension member of the conveyor belt is produced by aligning the filaments, during the extrusion of the tension member, by at least one mechanical aligning tool.

8. The method according to claim 6, wherein the directed state of the filaments in the tension member of the conveyor belt is produced by aligning the filaments, during the extrusion of the tension member, by applying an external electric field and/or an external magnetic field and/or an external electromagnetic field.

9. The method according to claim 6, wherein the directed state of the filaments in the tension member of the conveyor belt is produced by aligning the filaments by a stretching and/or rolling process of the extruded tension member and/or of the conveyor belt.

10. The method according to claim 1, wherein mechanical properties of the conveyor belt are specifically influenced by a definable alignment and/or a length and/or a diameter and/or the material and/or an initial proportion of the filaments in the tension member of the conveyor belt.

11. The method according to claim 1, wherein the filaments are separated from the conveyor belt by melting the conveyor belt and separating the filaments not melted in the process from the melt.

12. The method according to claim 11, wherein the unmelted filaments are separated from the melt of the conveyor belt by an intrinsic weight of the filaments and/or by applying an external magnetic field or an electric field or an electromagnetic field and/or a sifting process.

13. The method according to claim 1, further comprising cutting the recyclable conveyor belt into sections with a limited number of differing section lengths, on the basis of which an endless conveyor belt of variable length is produced by juxtaposing and connecting several selected sections having identical and/or differing section lengths.

14. A conveyor belt for carrying out the method according to claim 1, comprising:
the at least one belt layer, the at least one belt layer comprising the tension member, the tension member comprising at least the matrix material and filaments embedded in the matrix material,
wherein the tension member comprises the tension member starting material which is the recyclate produced by comminution of another conveyor belt that already contains desired proportions of filaments and/or matrix material as initial proportions, or the recyclate is configured to desired proportions in the tension member by admixing matrix material and/or filaments, and wherein a desired mechanical property of the conveyor belt is configured based on at least one of a definable alignment, a length, a diameter, a material, and an initial proportion of the filaments in the tension member of the conveyor belt.

15. The conveyor belt according to claim 14, wherein the filaments in the tension member of the conveyor belt are present in an undirected state within the matrix material, and, in a region of a joint of the conveyor belt, to form an endless conveyor belt, mechanical properties of the conveyor belt corresponding completely or almost to mechanical properties in uninterrupted regions of the conveyor belt.

16. The conveyor belt according to claim 13, wherein the recyclate comprises the comminuted conveyor belt.

17. The conveyor belt according to claim 14, wherein the matrix material only thinly surrounds the filaments in the form of a shell, and
wherein a ratio of volumes of matrix material to filaments in the tension member is less than two to one, or one to one, or one to two.

* * * * *